Dec. 4, 1934.　　W. M. BROWER　　1,983,162
ELECTRIC CLOCK
Filed May 10, 1932　　2 Sheets-Sheet 1
FIG_1_
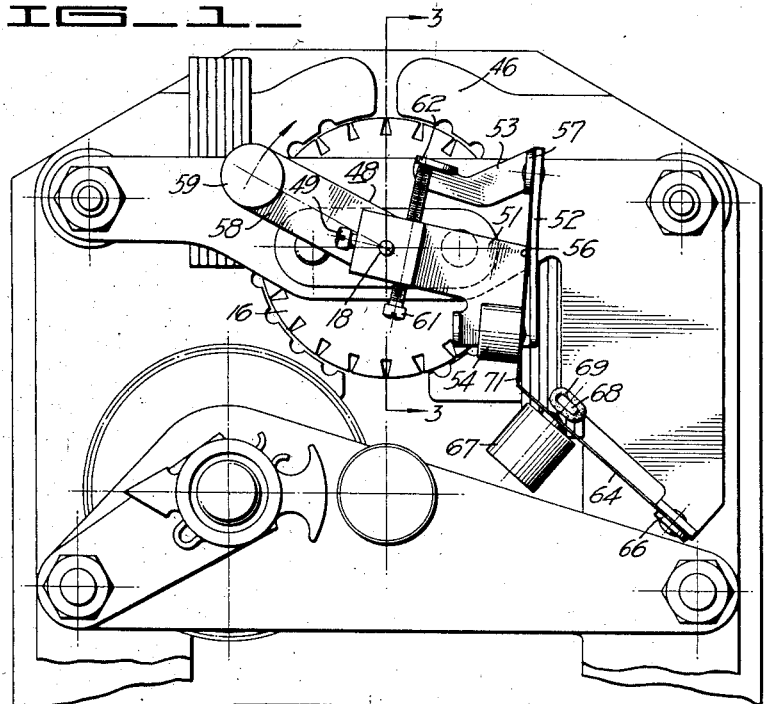
FIG_2_
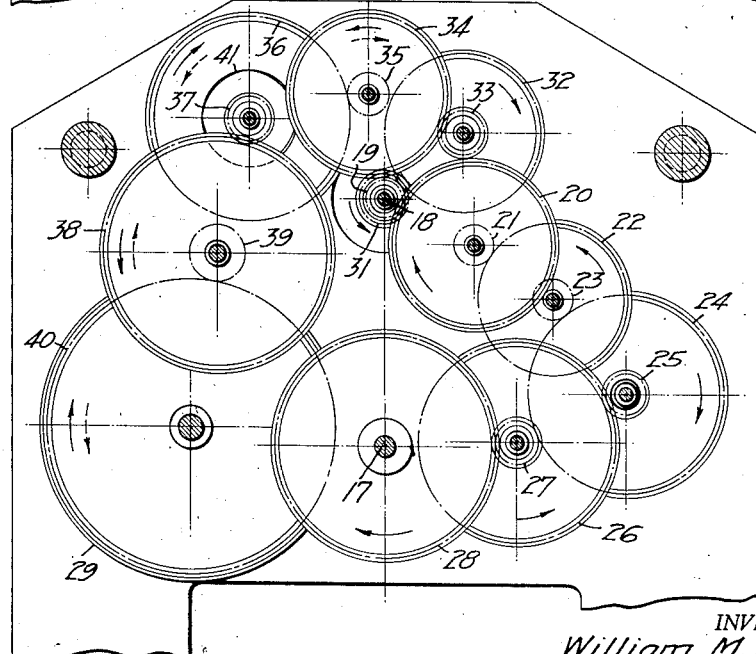
INVENTOR.
William M. Brower
BY
White, Prost, Fehr & Lothrop
ATTORNEYS.

Dec. 4, 1934.  W. M. BROWER  1,983,162
ELECTRIC CLOCK
Filed May 10, 1932   2 Sheets-Sheet 2
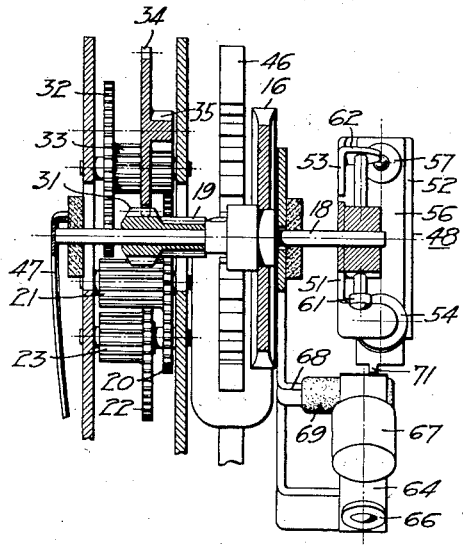
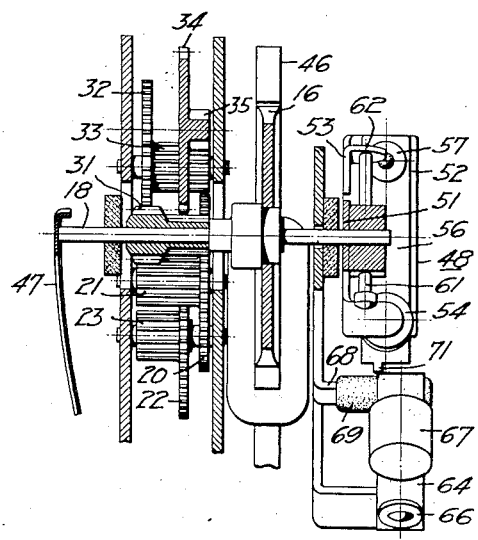
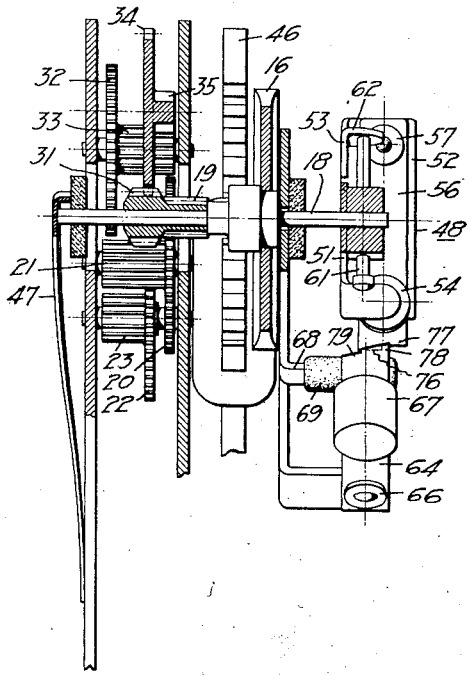
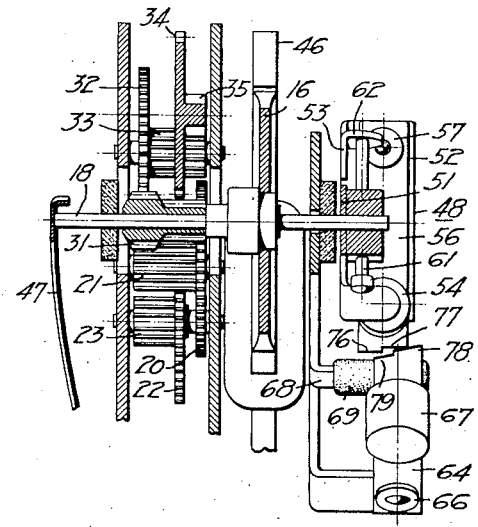
INVENTOR.
William M. Brower
BY
ATTORNEYS.

Patented Dec. 4, 1934

1,983,162

UNITED STATES PATENT OFFICE 1,983,162

ELECTRIC CLOCK

William M. Brower, Palo Alto, Calif., assignor to Stanford Products, Ltd., San Francisco, Calif., a corporation of California Application May 10, 1932, Serial No. 610,485

4 Claims. (Cl. 58—26)

This invention relates to electric clocks and more particularly it relates to a clock which is driven normally by an electric motor and which is adapted to be driven by a separate force, such as a spring motor, during periods of current interruption. One type of clock of this character is disclosed and claimed in my co-pending application Serial Number 597,003, filed March 5, 1932.

Preferably, the electric motor employed for driving the hands of the clock also serves to wind the spring motor. When the energizing current is interrupted through any cause whatever, the power stored up in the spring motor serves to impart rotation to the rotor of the motor in the same direction that the rotor is driven when the motor is energized. Thus, the spring serves to drive the hands of the clock during periods of current interruption. To insure correct time when the clock is being driven by the spring motor in an arrangement of this type, it is desirable to provide some means for controlling the rate of rotation of the rotor so that the speed thereof is substantially the same whether it is driven by the spring or by the magnetic force arising from the energization of the motor.

The electric motor employed can be designed primarily to have the running characteristics of a synchronous motor, but it can also have some of the characteristics of a squirrel cage induction motor, as disclosed in the co-pending application referred to. When energized by 60 cycle alternating current, the normal synchronous speed of the motor is 3600 R. P. M. at no load, but the characteristics of the motor and the load thereon are made such that the motor tends to run at a sub-synchronous speed of 300 R. P. M. when employed in the manner described. Slight variations in the load will not cause the motor to depart materially from a speed of 300 R. P. M. but if the load is reduced appreciably, the motor tends to increase its speed. In other words, the motor has a greater tendency to run at a speed of 300 R. P. M. than at speeds slightly over or slightly under this value.

When the rotor of the motor is driven by the spring, however, there is no predominating tendency for the rotor to run at any particular speed. When the spring is fully wound a greater driving force is applied than when the spring is almost completely unwound and the speed at which the rotor tends to rotate varies accordingly. A governor could be provided for maintaining the rate of rotation constant and at 300 R. P. M. when the motor is energized, or a governor could be provided to maintain the rate of rotation of the rotor at 300 R. P. M. when the spring motor is driving the rotor. A single governor having the same retarding characteristics in both instances would ordinarily be unsuitable for controlling the rate of rotation due to both driving forces, for the reason that the retarding effect desired when the motor is energized would be insufficient to hold the excess force of the spring motor in check and, on the other hand, a retarding effect suitable for the spring motor drive would be too great when the motor is energized. In one case, therefore, the rate of rotation due to the electric motor would be correct but that due to the spring motor would be too high, and in the other case, the speed due to the spring motor would be correct but that due to the electric motor would be too low.

It is a general object of this invention to provide means in a clock of the character described for insuring accuracy irrespective of which of the driving forces is active.

Another object is to provide a clock having an electric motor with a spring motor for tiding over periods of current interruption and means common to both the spring motor drive and the electric motor drive for regulating the rate at which the hands of the clock are driven.

Another object is to provide a governor in a clock of the character described which is suitable for maintaining the rate of rotation of a rotatable member in the clock at a desired value, when said member is to be driven by either one of two different driving forces.

Another object is to provide a governor in a clock of the character described in which means is provided for varying the retarding characteristics of the governor when the nature of the driving force is changed, whereby the governor is suitable for maintaining the rate of rotation constant, notwithstanding the change in the characteristics of the driving force.

Still another object is to provide a governor in a clock of the character described which is dependable and accurate.

These and other objects and advantages are attained in the embodiments of my invention illustrated in the accompanying drawings, in which:

Fig. 1 is a partial elevational view of a clock constructed in accordance with the principles of this invention, the clock casing being removed to show the internal construction.

Fig. 2 is a view illustrating certain gear trains interconnecting the hands of the clock with the electric motor and the spring motor.

Fig. 3 is a cross sectional view taken along the plane indicated by line 3—3 of Fig. 1, illustrating the position of the governor and the associated parts when the mechanism is being driven by the spring motor.

Fig. 4 is a cross sectional view similar to that of Fig. 3 showing the position of the parts when the electric motor is energized and serves as the driving medium.

Figs. 5 and 6 are cross sectional views similar to those of Figs. 3 and 4, respectively, illustrating a modification of the governor.

In its preferred form, the clock is provided with a governor having a rotatable portion which is mounted for rotation with the rotor of the electric motor. The rotatable portion of the governor comprises a resilient arm secured at one end and carrying a fly-weight at its free end which is adapted to assume a position determined by the centrifugal force arising from the rotation of the governor. Preferably, a relatively stationary resilient arm is provided which is likewise secured at one end only, but to some stationary part of the apparatus, the free end of the stationary resilient arm extending into the path taken by the free end of the rotatable resilient arm, when the governor is rotating at a predetermined speed. The force of the impact between the two arms serves to retard the velocity of the governor and the member being controlled when the velocity exceeds the desired value.

As heretofore mentioned, it is desired to maintain the rotor of the electric motor at a constant speed regardless of whether the motor is energized to rotate the rotor or whether the rotor is driven by an external force, such as a spring. When the motor is energized, the rotor has a greater tendency to rotate at the desired rate than at a higher rate and consequently, the retarding force required to restore the velocity to the desired value whenever it departs therefrom is relatively small. On the other hand, when the rotor is driven by the spring, there is no predominating tendency for the rotor to run at the desired speed and until the spring is nearly unwound, the driving force is in excess of that required to maintain the rotor running at the desired velocity. Therefore, when the spring is driving the rotor, the retarding effect of the governor should be greater than the retarding effect thereof when the motor is energized, in order to maintain the rate of rotation the same in both instances. For accomplishing this object means can be provided for altering the retarding characteristics of the governor when the nature of the driving force changes. In the embodiment chosen for illustration the impacting ends of one or both of the resilient arms can be shaped to vary the force of the impact as the point of impact changes its position. Means can also be provided for changing the point of impact when the driving force changes, so that one point of impact is established when the spring is driving and another point of impact is established when the motor is running under its own power. In this manner, the retarding effect of the governor is made dependent on the nature of the driving force.

Referring now to the drawings and first to Fig. 2 thereof, I have shown an arrangement of driving gears suitable for interconnecting the electric motor, the spring motor and the hands of the clock to attain the desired results. An electric motor is provided having a rotor 16 and when the motor is energized, the clock hands (not shown, but controlled by the shaft 17) are driven by a gear train including the following elements:— Pinion 19 on the shaft 18 of the rotor 16, gear 20, pinion 21, gear 22, pinion 23, gear 24, pinion 25, gear 26, pinion 27 and gear 28. Gear 28 effects rotation of the shaft 17 to drive the hands of the clock. Simultaneously, the electric motor serves to wind a spring motor 29 through a gear train which includes the following elements:—Pinion 31 on shaft 18, gear 32, pinion 33, gear 34, pinion 35, gear 36, pinion 37, gear 38, pinion 39 and gear 40. Rotation of gear 40 serves to wind the spring of the spring motor 29. During the tensioning operation, the gears of the spring gear train rotate in the direction indicated by the arrows shown in solid lines. A friction clutch 41 can be interposed in the spring gear train to allow the drive to slip when the spring motor has been wound up to the desired degree of tension.

If for any reason the energizing current of the motor should be interrupted, it is desired to drive the hands of the clock by the energy stored in the spring motor 29. For accomplishing this object means is provided, which will presently be described more fully, for shifting the pinion 31 out of engagement with gear 32 and into meshing engagement with gear 34. This action reverses the direction of drive of the spring gear train between the rotor 16 and the spring motor 29. Consequently, when the energy stored in the spring motor is being used to drive the rotor 16, the rotor turns in the same direction that it does when it is energized. The spring motor serves to rotate the rotor 16 and also the hands of the clock, during periods of interruption, through a gear train which includes the following elements:—Gear 40, pinion 39, gear 38, pinion 37, gear 36, pinion 35, gear 34, pinion 31 and rotor 16, pinion 19, gear 20, pinion 21, gear 22, pinion 23, gear 24, pinion 25, gear 26, pinion 27 and gear 28. The gear 32 runs idle under this condition. The direction of rotation of the gears 34, 36, 38 and 40 of the spring gear train is now in the direction indicated by the arrows shown in dotted lines, but the direction of rotation and the ratio of the gear train between rotor 16 and the hands of the clock remain unchanged.

For shifting the pinion 31 from meshing engagement with gear 32 and into meshing engagement with gear 34, and vice versa, I have shown the shaft 18 of the rotor 16 as being supported for longitudinal movement between the position shown in Fig. 3 and the position shown in Fig. 4. When the field poles 46 of the motor are energized, an electromagnetic force is set up which attracts the rotor 16 into substantial alignment with the field poles, as shown in Fig. 4. The pinion 31 then meshes with the gear 32, as illustrated. A biasing spring 47, mounted in any suitable manner on the framework of the clock, bears against the end of shaft 18 and normally urges the same toward the right, as viewed in Figs. 3 to 6. When the energizing current of the electric motor is interrupted, the motor armature 16 is moved to the position shown in Fig. 3 by the spring 47, longitudinal movement of the shaft 18 also causing the pinion 31 to be withdrawn from engagement with gear 32 and to be placed in meshing engagement with the gear 34. The pinion 19 is made sufficiently wide to mesh with gear 20 in either position of the shaft 18. Accordingly, when the driving force changes from the electric motor to the spring motor, the parts move from the position shown in Fig. 4 to the position shown in Fig. 3. Upon resumption of the energization of the motor, the parts are again restored to the position shown in Fig. 4.

For controlling the rate of rotation of the rotor 16, a governor 48 is mounted on shaft 18 and secured by any suitable means, such as a set screw 49. The governor 48 comprises an arm 51 which can have the general shape indicated in Fig. 1. The end of arm 51 can be bent at right angles, as at 52, to form one arm of a structure simulating a bell crank lever, the other arm 53 of which extends at an angle from one end of the portion 52. A fly weight 54 is carried at one end of a resilient arm 56, the other end of arm 56 being secured to the portion 52, as at 57. For counterbalancing the governor structure about the shaft 18 an arm 58 can be provided which carries a counter-weight 59 of the desired mass. Fine adjustments of the position of the resilient arm 56 are afforded by means of an adjusting screw 61, the end of the screw 61 abutting against a projection 62, provided for this purpose on the arm 53. By turning the screw 61 a flexing force is applied to the arm 52 and the extent to which the arm 52 is flexed determines the position assumed by the resilient arm 56 on account of the structural relationship between the parts.

As the governor 48 rotates, the resilient arm 56 swings outwardly relative to the center of rotation under the influence of the centrifugal force arising from the rotation of the governor. A relatively stationary resilient arm 64 secured at one end, as at 66, to the framework of the clock, carries a weight 67 near its free end. The free end of the stationary resilient arm 64 extends into the path taken by the free end of the rotatable resilient arm 56 when the governor is rotating at a predetermined speed. The impact between arms 56 and 64 produces a retarding effect which is designed to preclude rotation of the governor at a greater average velocity than that desired. Whenever the velocity of the governor exceeds the desired value, the force of the impact retards the rotation bringing it down to a value such that the average rate of rotation is substantially equal to that desired. The force of the impact is expended not only to retard the velocity of the governor, but also to move the resilient arm 64 out of the path of the end of the rotating resilient arm 56. In this manner a yieldable counteracting force is applied to retard the governor, as distinguished from the unyielding counteraction that would arise from the use of an immovable obstruction placed in the path of the rotating arm 56. Accordingly, the retarding effect is more gradual and is susceptible of closer adjustment. The weight 67 serves to increase the mass and the inertia of the arm 64 without impairing the resiliency of the arm. In order to check the rebound of arm 64, a suitable abutment 68 can be provided and a covering of sound deadening material 69, such as rubber can be disposed about the abutment to render the impact inaudible.

As heretofore mentioned, it is desired to vary the retarding characteristics of the governor automatically whenever the nature of the driving force changes. To accomplish this object, use is made of the longitudinal movement of the shaft 18 which, as heretofore described, occupies the position shown in Fig. 3 when the spring motor is driving and the position shown in Fig. 4 when the electric motor is driving. The rotating portion of governor 48, being mounted on the shaft 18, changes its position relative to the stationary resilient arm 64 whenever the rotor 16 and the shaft 18 move from one position to the other.

When the electric motor is energized, the driving force is such that there is a greater tendency for the rotor 16 and the governor 48 to rotate at the desired speed than at other speeds, because the synchronous speed of the motor corresponds with the desired speed of rotation. The tendency to depart from the desired speed is relatively slight, therefore, and accordingly, the retarding effect of the governor should be correspondingly slight so that the average rate of rotation will be that desired and not some lower rate. If, for example, the retarding force were made too great to offset a slight tendency to increase the speed, the average speed would be too low.

In Figs. 3 and 4, I have shown one manner in which the retarding effect of the governor can be changed to suit the nature of the driving force. An extending projection 71 is provided at the impacting end of the rotatable arm 56 and the position of this projection relative to the arm 64 determines the point of impact on arm 64. The parts are so arranged that when the electric motor is energized the projection 71 strikes the arm 64 near one edge thereof. Since the arm 64 is made of resilient material, it is subjected to a twisting movement when it is struck obliquely in this manner and, as a consequence, the projection 71 merely grazes the edge of arm 64. The retarding effect of the impact is correspondingly slight, but the construction of the parts is such that this slight retarding effect is that required to offset the tendency of the rotor 16 to increase its speed when the motor is energized.

When the spring motor 29 is employed to rotate the rotor 16 and the governor 48, however, there is no predominating tendency for the parts to rotate at the desired speed. When the spring motor is fully wound the applied force is sufficient to rotate the parts at a speed considerably in excess of that desired and even when the spring is partially unwound, the force is still in excess of that required to rotate the parts at the desired speed. The retarding effect arising from the grazing of the arm 64 by the projection 71, just described, is insufficient under these conditions to offset the excess force of the spring motor. To provide an increased retarding effect when the spring motor is driving the apparatus, the projection 71 is made to strike the arm 64 more squarely and nearer the longitudinal center line of the arm. The arm 64 can be made sufficiently wide so that movement of the governor from the position shown in Fig. 4 to the position shown in Fig. 3 brings the projection 71 from the edge of the arm 64 to the exact center thereof or to any other desired position relative to the center line of the arm. Thus, in Fig. 3 I have shown the arm 64 as having a width such that the projection 71 strikes the arm slightly to one side of the center line, but the point of impact is considerably closer to the center line than when the projection grazes the longitudinal edge of the arm, as shown in Fig. 4. The twisting movement of the arm 64 is reduced, therefore, and can be entirely eliminated, if desired, when the spring motor serves as the driving force. The force of the impact being closer to the center of inertia of the mass 67, the retarding effect is made more pronounced. In other words, the weight or mass 67 must be moved a greater distance to clear the path of the projection 71 when the parts are in the position shown in Fig. 3 than when the parts are in the position shown in Fig. 4, assuming that the velocity of the governor is the same in both instances. It is to be understood that the effective width of the end of arm 64 can be made to have any desired extent and that the relative movement of the projection 71 from the position shown in Fig. 4 to the position shown in Fig. 3 can be utilized to shift the point of impact a corresponding distance along the end of the arm 64. For example, the point of impact established when the governor is in the position shown in Fig. 4 can be made to occur a slight distance inwardly from the edge of arm 64, instead of at the edge as shown, to afford an increased retarding effect when the electric motor is driving. Also, the point of impact which is established when the governor is in the position shown in Fig. 3 can be made to occur at a relatively smaller or greater distance from the center line of arm 64 to provide the desired retarding effect for the particular type of spring motor employed.

In Figs. 5 and 6 I have illustrated another manner in which the impacting ends of the arms 56 and 64 can be shaped to secure the desired results. When the electric motor is energized, the parts assume the position shown in Fig. 6. The end of arm 56 is stepped, as shown, having a high portion 76 and a low portion 77. The end of arm 64 has a somewhat similar form providing a high portion 78 and a low portion 79. The end of arm 64 and particularly the high portion 78 thereof can be cut at an angle with the longitudinal edge of the arm, as shown, so that when the parts are in the position shown in Fig. 6, the outermost corner of the low portion 77 will establish the point of first impact between the arms. When the electric motor is energized and the rate of rotation is such that the corner of the low portion 77 of arm 56 grazes the high portion 78 of the arm 64, the retarding effect will be relatively slight and the parts can be so constructed that the resulting retarding effect is that suitable for maintaining the rate of rotation at the desired value.

When the motor is de-energized, however, and the spring motor becomes effective, the governor is moved to the position shown in Fig. 5. For the same rate of rotation as was assumed in describing Fig. 6, the arms 56 and 64 will impact substantially as shown in Fig. 5, the high portion 76 of arm 56 striking the high portion 78 of arm 64. It is apparent that the arms strike each other more squarely under these conditions and, accordingly, the retarding characteristics of the governor become more pronounced. By properly proportioning the parts the retarding effect can be made such as to hold the excess force of the spring motor in check, so that the rotation of the parts is substantially the same as when the electric motor is energized. The construction shown in Figs. 5 and 6 is susceptible of variations to adapt the governor to the particular electric motor or spring motor employed, along somewhat similar lines to those described in connection with the embodiment shown in Figs. 3 and 4.

From the foregoing description it will be readily seen that the retarding characteristics of the governor are changed automatically in response to a change in the nature of the driving force, thereby providing an arrangement whereby the rate of rotation of the parts can be kept at substantially the same average speed when either one of the driving forces is effective.

While I have shown and described certain preferred embodiments of my invention, it is to be understood that I do not wish to be limited thereto, since the invention as defined in the appended claims can be embodied in a plurality of other forms.

I claim:
1. In an electric clock, a rotatable member, a first means for rotating said member, a second means for rotating said member upon and during cessation of operation of said first means; said first and second means having unequal driving forces, a governor for controlling the rate of rotation of said member, one of said means having a greater tendency to drive the member at the desired speed than at other speeds and the other means having no predominating tendency in this regard, a shaft for supporting said governor for rotation with said member, said governor comprising a rotating resilient arm adapted to assume a position determined by the centrifugal force arising from the rotation of the governor, a resilient arm secured at one end only to a fixed support and having its free end extending into the path taken by the first mentioned resilient arm when the governor is rotating at a predetermined speed, whereby the ends of said resilient arms strike one another to retard the rate of rotation of the governor and said member, means for moving said shaft and the governor thereon from one position to another automatically in response to a change from one to the other of said first and second means without effecting corresponding movement of said relatively stationary resilient arm, the ends of said resilient arms being shaped to alter the retarding effect of the impact for different longitudinal positions of the governor shaft, whereby the retarding forces of the governor are varied for different longitudinal positions of the governor shaft at a given rate of rotation.

2. An electric clock comprising a rotatable member, a first means for rotating said member, a second means for rotating said member upon and during cessations of operation of said first means; the driving forces of said first and second means being unequal, a governor for controlling the rate of rotation of said member, said governor including means for imparting certain retarding forces to said member when being rotated by said first means and for imparting different retarding forces to said member when being rotated by said second means whereby the average rate of rotation of said member is substantially the same when the member is being rotated either by said first means or by said second means, and means for altering the retarding forces imparted to said member by said last named means automatically in response to a change from one to the other of said first and second means.

3. An electric motor mechanism comprising a synchronous electric motor operable at a sub-synchronous speed, an auxiliary spring motor, means for driving said synchronous motor from said auxiliary motor during interruptions of current to said electric motor, and speed control means for said motors; said speed control means including means for automatically varying the energy absorbed by said speed control means in accordance with a change from one to the other of said motors.

4. In apparatus of the character described, an electric motor including a rotor carried by a rotatable shaft, said shaft being shiftable longitudinally between two limiting positions, means for biasing said shaft towards one limiting position, said motor also including a stator which when electrically energized serves to shift said shaft together with said rotor against said bias to the other limiting position, an auxiliary spring motor serving to drive said shaft when the same is in said one limiting position, and speed governing means connected to said shaft, said speed governing means including elements for automatically varying the energy absorbed by the same for the two limiting positions of said shaft, whereby the shaft is caused to rotate at substantially the same speed in said two limiting positions.

WILLIAM M. BROWER.